United States Patent [19]
Krause

[11] 4,416,571
[45] Nov. 22, 1983

[54] TRUCK AND RAIL TRANSPORTATION SYSTEM

[76] Inventor: Robert A. Krause, 3838 Rainbow Blvd., Apt. 708, Kansas City, Kans. 66103

[21] Appl. No.: 234,647

[22] Filed: Feb. 17, 1981

[51] Int. Cl.³ .......................... B60F 1/04; B60P 3/32; B61D 3/12
[52] U.S. Cl. .................................. 410/53; 105/4 R; 105/159; 105/215 C; 410/45; 410/54
[58] Field of Search ............... 105/157 R, 159, 215 R, 105/215 C, 4 R; 410/53, 44, 45, 54

[56] References Cited

U.S. PATENT DOCUMENTS

| | | | |
|---|---|---|---|
| 1,850,814 | 3/1932 | Snyder | 198/513 X |
| 1,994,815 | 3/1935 | Ferrin | 410/53 X |
| 2,036,535 | 4/1936 | Nelson | 410/53 X |
| 2,066,836 | 1/1937 | Hughes | 410/53 X |
| 2,589,678 | 3/1952 | De Lay | 105/157 R X |
| 2,709,969 | 6/1955 | Andert | 410/53 |
| 2,787,971 | 4/1957 | Obes | 410/53 X |
| 2,800,086 | 7/1957 | Wike | 105/159 |
| 2,841,094 | 7/1958 | Schumacher | 410/53 |
| 2,876,016 | 3/1959 | McClellan | 410/53 |
| 2,920,580 | 1/1960 | Williams | 410/1 X |
| 2,981,209 | 4/1961 | Flemming | 105/159 X |
| 3,086,483 | 4/1963 | Scheldrup | 105/159 |
| 3,317,219 | 5/1967 | Hindin et al. | 410/53 |
| 3,532,061 | 10/1970 | Bohm | 410/44 X |
| 3,610,169 | 11/1971 | Shannon | 410/1 X |
| 3,812,791 | 5/1974 | Barnard | 410/44 |
| 3,834,322 | 9/1974 | Meier et al. | 410/53 |

*Primary Examiner*—Robert B. Reeves
*Assistant Examiner*—Howard Beltran
*Attorney, Agent, or Firm*—Zarley, McKee, Thomte, Voorhees & Sease

[57] ABSTRACT

The present invention comprises an elongated container which may be carried either by rail or on a highway by a conventional truck tractor. The container includes a pair of dolly engaging pins fixed to its floor at the opposite ends thereof. The pins are adapted to engage a fifth wheel mechanism mounted on a dolly having wheels thereon adapted to engage conventional railroad rails. The dolly includes two fifth wheel mechanisms, one for receiving the pin from one container and the other for receiving the pin from another container. Also mounted on the undersurface of the container is a fifth wheel carriage which is adapted to slide longitudinally with respect to the container and which is adapted to engage the fifth wheel mechanism of a conventional truck tractor. A pair of truck wheels are mounted on a carriage which can be mounted to the rear end of the container for use on a highway when being pulled by a truck tractor.

7 Claims, 10 Drawing Figures

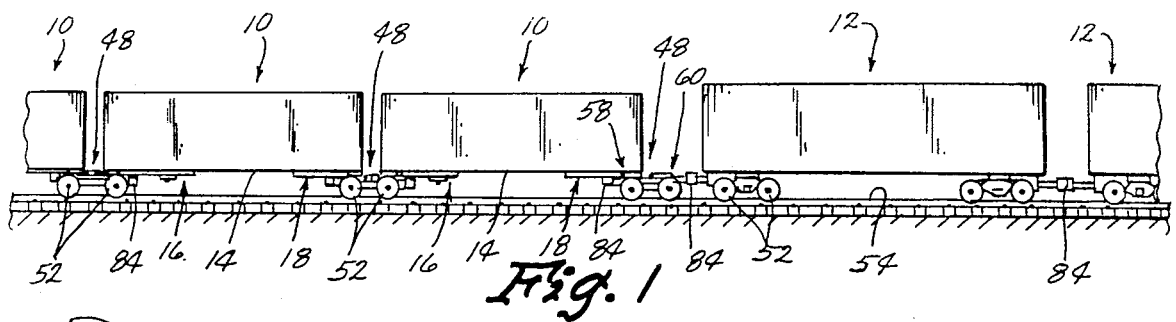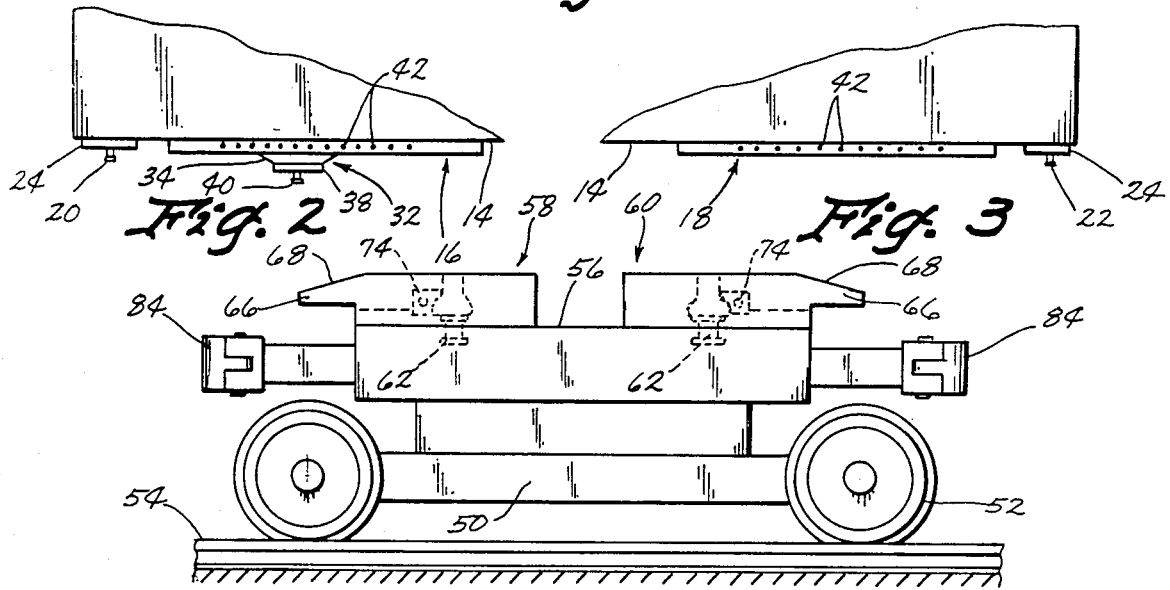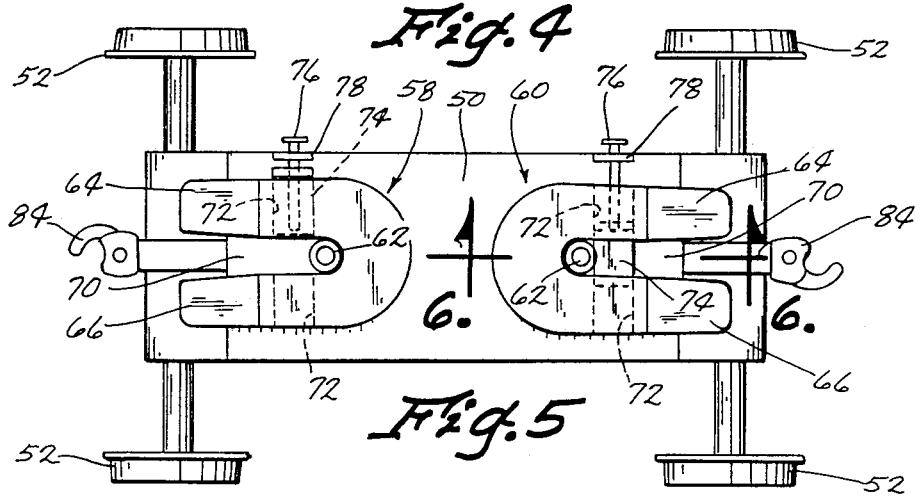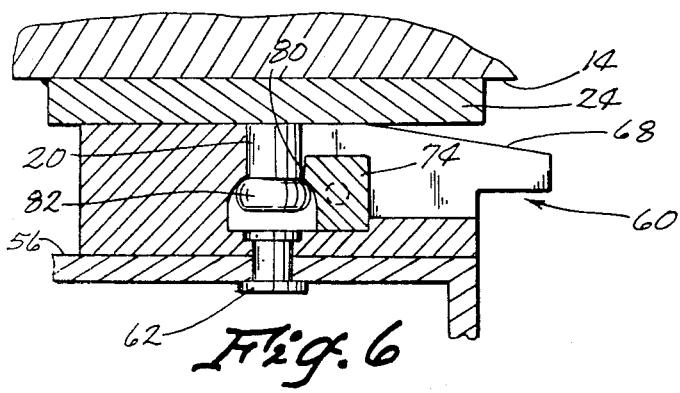

TRUCK AND RAIL TRANSPORTATION SYSTEM

BACKGROUND OF THE INVENTION

This invention relates to a truck and rail transportation system.

One major problem in most systems for transporting goods is the necessity for handling the goods numerous times during the time that they are being transported. A prime example of this is the transportation of grain. The grain is first handled when it is taken from the field and placed in storage on the farm. A second handling will occur when the grain is taken from the farm storage or the field to a sub-terminal, usually by truck or wagon. A final handling is required when the grain is taken from the sub-terminal to the terminal for loading on a unit train for transporting long distances.

Each handling results in warehouse costs, handling costs, and shrinkage costs.

Furthermore, the recent trend has been to abandon many railroad spur lines in the nation's grain belt. Consequently, there is an opportunity to develop a transportation system designed to eliminate as many warehousings and handlings as possible.

Therefore, a primary object of the present invention is the provision of an improved truck and rail transportation system.

A further object of the present invention is the provision of a plurality of containers which may be utilized sequentially for storage, highway transportation, and rail transportation.

A further object of the present invention is the provision of a container having both railroad wheels and highway wheels.

A further object of the present invention is the provision of a truck and rail transportation system having fifth wheel mechanisms for engaging a railroad bogie and for engaging the fifth wheel mechanism of a truck tractor.

A further object of the present invention is the provision of a container having railroad wheels and highway engaging wheels which may be adjusted longitudinally with respect to the container, and which may also be removed according to choice.

A further object of the present invention is the provision of a truck and rail transportation system wherein a truck fifth wheel mechanism is mounted on the undersurface of the container and may be moved longitudinally to accommodate truck tractors of different dimensions.

A further object of the present invention is the provision of a device which is economical to manufacture, durable in use and efficient in operation.

A further object of the invention is the provision of a truck and rail transportation system wherein conversion from the truck mode to the rail mode, and vice versa, can be done without a crane, gantry, or other such external elevating devices.

SUMMARY OF THE INVENTION

The system of the present invention utilizes a container, a railroad bogie, a set of trailer axles, male fifth wheel pins mounted to the container for engaging the railroad bogie, and a movable male fifth wheel pin mounted movably to the container for engaging the fifth wheel mechanism of a truck tractor.

The railroad bogie includes a set of railroad wheels adapted to engage railroad rails. The bogie includes two fifth wheel mechanisms thereon, one for engaging one end of one container and one for engaging the other end of another container. These fifth wheel bogies are rotatably mounted so as to provide a pivotal point between the bogie and the containers. Thus, the bogie spans the distance between two containers.

The trailer tandem axle includes a frame which is adapted to retentively engage a pair of spaced apart rails on the undersurface of the container. The trailer tandem axle may be moved longitudinally within these rails so as to be positioned at the most desirable point.

A fifth wheel male pin is mounted on a carriage which is movably mounted to the undersurface of the container. The fifth wheel carriage permits this pin to be moved longitudinally with respect to the container so that it can be placed in the proper position for engaging the fifth wheel mechanism of a truck tractor which operates in the following fashion for grain collection.

The highway tandem wheels are mounted on the container and the container is attached to the fifth wheel mechanism of a truck tractor. The truck tractor then pulls the container to the grain which is located either directly at the farm or at a sub-terminal. After filling the container, the tractor can carry the container to one of two places. It can take the container to a storage area where the container would be placed on the ground for storage. As an alternative, the container can be transported by the truck tractor to a rail transport terminal. There, the container is removed from the truck tractor by a crane and the tandem axle is removed from the container. The container is then lowered onto the fifth wheel mechanisms of a pair of spaced apart rail bogies. Alternatively, the container can be transferred from the truck tractor to the rail bogies without a crane gantry, or other such external elevating devices. The rail bogies are spaced apart and the fifth-wheel mechanisms pivoted so tht the truck tractor can back the back end of the container into one fifth-wheel mechanism and maneuver the front end of the container into the other spaced apart fifth-wheel mechanism. A level-to-level transfer from the side of the railroad rails is then accomplished. Having now been placed on the rails as part of a unit train, the container can be transported to a distant location.

By using the present system, it is possible to reduce the number of tandem axles which might be needed at any given time. In addition, the system is simple. There are no hydraulic systems to malfunction. Furthermore, there are greater savings in the elimination of warehousing.

BRIEF DESCRIPTION OF THE DRAWINGS

FIG. 1 is a side view of several containers of the present invention connected together, and also connected to conventional railroad cars.

FIG. 2 is a partial side elevational view of one end of the container.

FIG. 3 is a partial side elevational view showing the opposite end of the container.

FIG. 4 is a side elevational view of the bogie which is positioned between the containers.

FIG. 5 is a top plan view of the bogie shown in FIG. 4.

FIG. 6 is a sectional view taken along line 6—6 of FIG. 5 of one of the fifth wheel mechanisms of the bogie, showing the male fifth wheel pin of the container attached thereto.

DETAILED DESCRIPTION OF THE INVENTION

Figure 7:
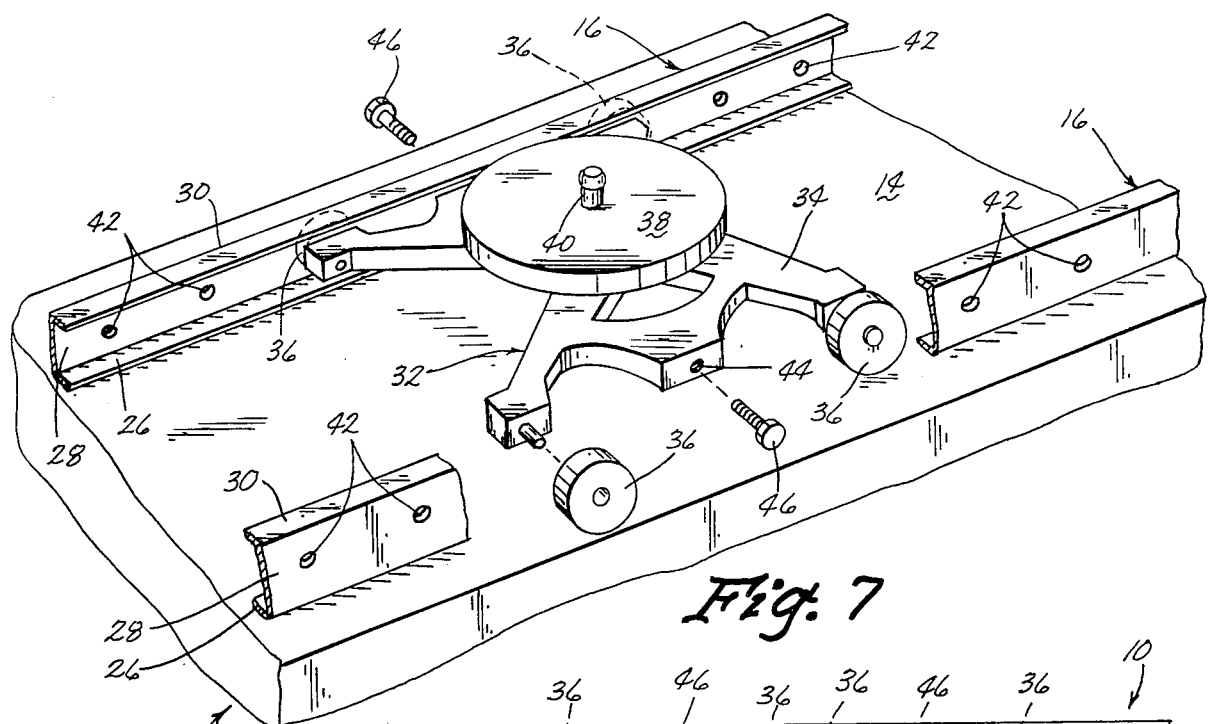
FIG. 7 is a perspective view of the bottom surface of the container showing the movable fifth wheel pin assembly thereon.
Figure 8:
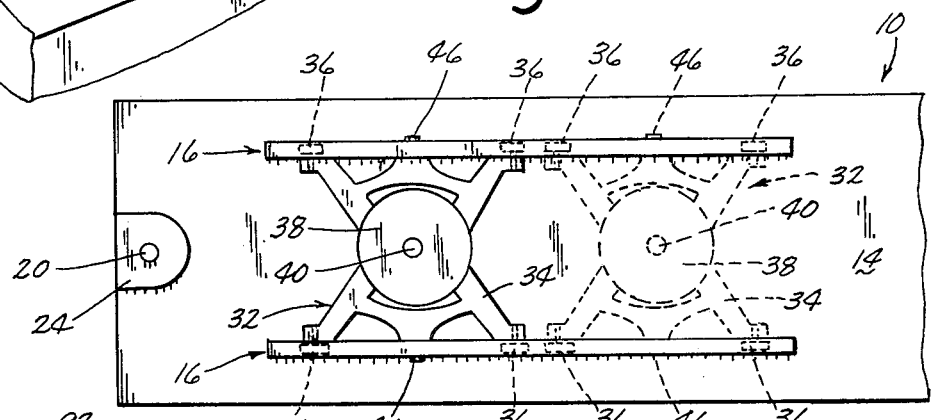
FIG. 8 is a bottom plan view of the device shown in FIG. 7.

The numeral 10 generally designates a container utilized for the present invention. In FIG. 1, three containers 10 are shown connected to a conventional railroad car 12. Each container 10 includes a bottom frame 14.

Mounted on bottom frame 14 are two pairs of rails 16, 18 each mounted adjacent one of the opposite ends of the container 10. Also mounted to the bottom of container 10 are a pair of fixed pins 20, 22 each located at the opposite ends of container 10. Pins 20, 22 extend downwardly frotm a flat plate or pancake or bolster 24 which is fixed to the under-surface of bottom frame 14.

As can be seen in FIG. 7, rails 16, 18 are C-shaped in cross-section and face one another. Each rail includes an upper horizontal portion 26, a vertical web 28 and a lower horizontal portion 30.

Mounted for rolling movement along rail 16 is a fifth wheel carriage 32, which comprises a carriage frame 34, a plurality of wheels 36, a pancake or plate or bolster 38 and a downwardly projecting fifth wheel pin 40. Wheels 36 are engaged within the C-shaped rail 16 and are adapted to roll longitudinally therealong. Each rail 16 has a plurality of holes 42 therein which are adapted to register with a threaded hole 44 in carriage frame 34. This permits the carriage frame 34 to be locked against movement with respect to rails 16 merely by inserting a threaded pin 46 through one of holes 42 and into threaded hole 44.

Referring to FIGS. 4–6, a bogie 48 includes a bogie frame 50 having a plurality of railroad wheels 52 rotatably mounted thereon for engaging conventional railroad rails 54. Frame 50 includes an upper horizontal platform 56. A pair of fifth wheel frames 58, 60 are mounted on the upper surface of platform 56 by means of a pair of pivot pins 62. Pins 62 provide pivotal connection of frames 58, 60 to platform 56 for pivotal movement about two spaced apart axes which are longitudinally spaced from one another.

Each frame 58, 60 includes a pair of cam members 64, 66 having a cam surface 68 thereon. Members 64, 66 are spaced apart so as to provide an elongated slot 70 for receiving fixed pins 20, 22 of container 10.

Extending transversely through each fifth wheel frame 58, 60 is a channel 72 having a cross-section sized and shaped to receive a sliding block 74. Block 74 is slidably inserted within channel 72 and includes a lead screw 76 threadably extending through the center thereof. Lead screw 76 is supported by a bracket 78 on bogie frame 50. Rotation of lead screw 76 causes longitudinal movement of sliding block 74 from the withdrawn position shown in the left hand portion of FIG. 5 to the extended position shown in the right hand portion of FIG. 5. In its extended position, block 74 spans the distance between cam members 64, 66.

The purpose of block 74 is to provide a locking mechanism for holding one of the fixed pins 20 within slot 70. As shown in FIG. 6, pin 20 fits into the extreme inner end of slot 70. During the time that pin 20 is being inserted into slot 70, block 74 is held in its retracted position as shown in the left hand side of FIG. 5. After pin 20 is in place, lead screw 76 is rotated to cause block 74 to move longitudinally to its extended position, spanning the distance across slot 70. In this position shown in FIG. 6, a lip 80 on block 74 engages a small projection 82 on the bottom of pin 20. This holds pin 20 retentively within the receptacle provided by the inner end of slot 70.

It is possible to place pin 20 of one container into one of the fifth wheel frames 60 and to place the pin 20 of a second container 10 within the fixed wheel frame 58 of bogie 48. This is the arrangement shown in FIG. 1, wherein each bogie 48 spans the distance between the ends of two containers. The containers pivot about the pivotal axis 62 of each fifth wheel frame 58, 60.

Each bogie has a pair of conventional couplers 84 extending from the opposite ends thereof. These couplers are non-functional when two containers are secured together as shown in the left hand side of FIG. 1. However, these couplers permit the containers to be coupled with a conventional railroad car 12 as is shown in the right hand side of FIG. 1.

Figure 9:
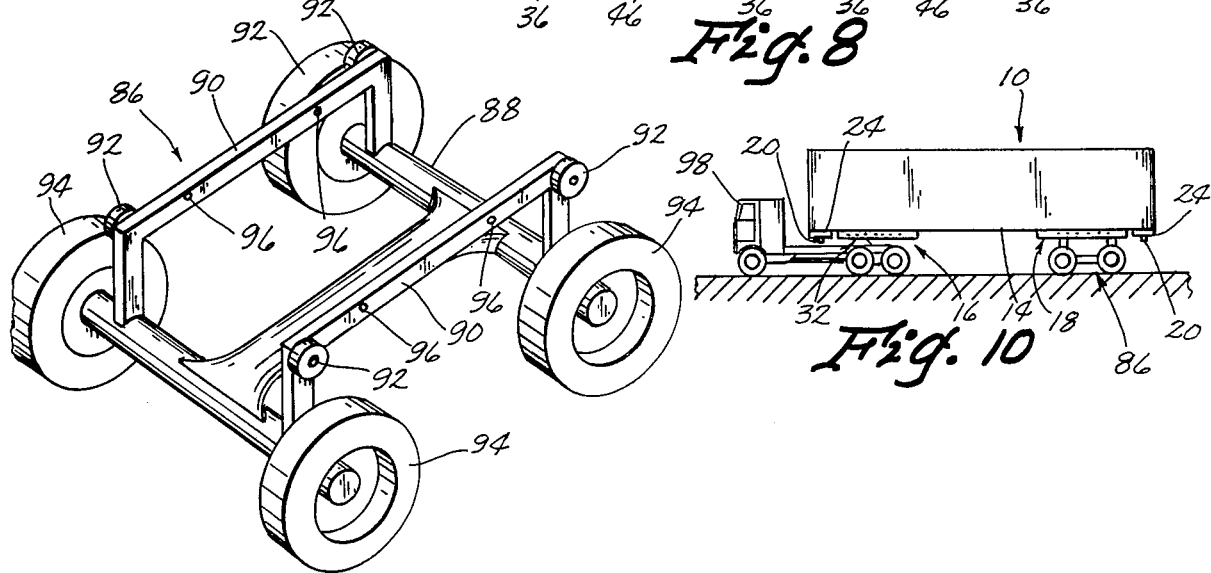
FIG. 9 is a perspective view of the tandem axle assembly which is mounted to the rear of the container for highway use.

When it is desired to use container 10 as the trailer of a truck for highway use, it is necessary to place a tandem axle assembly 86 (FIG. 9) on the lower portion of container 10. Tandem axle assembly 86 includes a frame 88 having a pair of upper horizontal frame members 90 thereon. A plurality of bearing wheels 92 are mounted at the opposite ends of upper frame members 90 and are sized to be received within the C-shaped channels formed by the spaced apart rails 18 on the bottom of container 10. Frame 88 also has four wheels 94 of conventional construction for engaging the highway. Upper frame members 90 include a plurality of threaded holes 96 therein adapted to register with the various holes 42 within rails 16. A bolt or pin (not shown) similar to bolt 46 (FIG. 7) extends through the registered holes 42, 96, for retentively holding tandem axle assembly 86 against longitudinal movement within rails 18.

Figure 10:
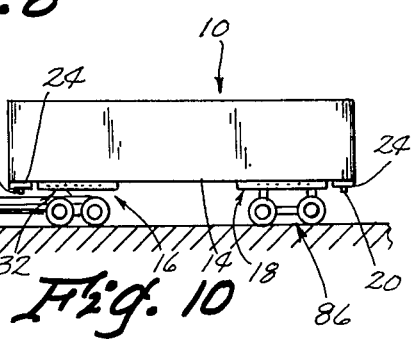
FIG. 10 is a side elevational view showing the container in position on a truck tractor for highway transporting.

Aftr tandem axle assembly 86 has been mounted to container 10, it is merely necessary to insert pin 40 of fifth wheel carriage 32 (FIG. 7) into the fifth wheel axle receptacle of a conventional truck tractor such as designated by the numeral 98 in FIG. 10. This may be done by lifting container 10 with a crane and lowering it so that pin 40 is inserted into the fifth wheel receptacle of tractor 98. As an alternative, container 10 can be transferred from truck tractor 98 to rail bogies 48 without a crane, gantry, or other such external elevating devices. A pair of rail bogies 48 are spaced apart the approximate distance between fifth-wheel pins 20 and 22 on container 10. Tractor 98 is used to back the container 10 from the side of the railroad rails 54 towards one of the bogies 48. Fifth-wheel 58 or 60 on bogie 48 is then pivoted so that it will receive fifth-wheel 20 at the back end of trailer 10. Once fifth-wheel pin 20 is secured within fifth-wheel mechanism 58 or 60, tractor 98 continues to move the front end of trailer 10 to mate with the other fifth-wheel mechanism 58 or 60 which has been pivoted on the other bogie 48. Fifth-wheel carriage 32 and highway tandem wheels 86 are longitudinally adjustable along the bottom of container 10 when this loading is occurring to provide clearance for railroad bogies 48 to receive fifth-wheel pins 20 and 22. Highway tandem wheels 86 are then removed, fifth-wheel pins 20 and 22 are locked to fifth-wheel mechanisms 58 and 60, tractor 98 pulls away, and the conversion is completed. Converting container 10 back to highway mode involves the reverse of the above operation and the procedure can be used with any number of containers 10. The vehicle is then ready to be transported by highway to the desired destination.

The present invention greatly simplifies and improves the transportation system for such items as grain. The grain can be placed in the container at the site of harvesting or at the point of storage. The container then can be placed on the ground for storage, or if desired, can be transported by highway in the mode shown in FIG. 10 to a rail shipping point. At the rail shipping point, the container 10 is lifted by a crane or by other means, the tandem axle assembly 86 is removed, and the container is lowered onto a bogie 48 with pins 20 in the receptacle provided by slot 70 of each fifth wheel assembly 58, 60. Alternatively, container 10 can otherwise be stored and then retrieved and converted to rail mode by the level-to-level transfer procedure described previously. The container can then be transported by rail to its destination and again converted into the highway mode by placing a tandem axle on the rear portion thereof. Thus, the present invention makes it possible to handle the grain only once to place it within the container, and after that all other shipping may be conducted without further handling of the grain. This should provide substantial improvement in the efficiency and ease with which grain can be transported to various destinations throughout the world.

The various axle assemblies normally can be installed and removed by relatively small equipment, such as front end loaders or the like.

Thus, it can be seen that the device accomplishes at least all of its stated objectives.

What is claimed is:

1. A convertible rail and highway vehicle for use on railroad rails, and for use on highways with tractors having a fifth-wheel mechanism, said vehicle comprising:

an elongated container having a bottom exterior surface, said bottom exterior surface having first and second opposite ends and opposite lateral sides;

a first pair of spaced apart rails mounted at one of said first ends of said container floor and a second pair of spaced apart rails mounted at said second end of said container floor;

a fifth wheel carriage having a base with a fifth-wheel plate and a fifth-wheel pin and having a plurality of wheels rotatably attached to said base retentively engaging said first pair of spaced apart rails and beiang adapted to roll along said rails to permit longitudinal movement of said fifth-wheel carriage with respect to said container;

carriage locking means for locking said fifth-wheel carriage to said rails to prevent longitudinal movement thereon;

said fifth-wheel carriage having said fifth-wheel pin extending downwardly therefrom for engagement with said fifth wheel mechanism of said tractor;

a highway wheel carriage having a carriage frame, highway wheels for engaging a highway being rotatably mounted to said carriage frame, and a plurality of wheels rotatably mounted to said carriage frame adapted to retentively engage said second pair of spaced apart rails for rolling movement thereon in a longitudinal direction with respect to said container;

second locking means for locking said carriage frame to said second pair of rails to hold said carriage frame against longitudinal movement thereon;

first and second bogie engaging pins attached to said first and second ends of said container floor and extending downwardly therefrom;

a railroad bogie having a bogie frame having a longitudinal axis, a pair of wheel axles transverse to said longitudinal axis, railroad wheels rotatably mounted on the ends of said wheel axles, railroad rails for rolling movement thereon, and first and second couplers extending from opposite ends of said bogie frame, a pair of fifth wheel mechanisms pivotally mounted on said bogie frame for pivotal movement about first and second pivotal axes which are spaced apart longitudinally on said bogie frame; and said fifth wheel mechanisms each having a receptacle sized for receiving one of said bogie engaging pins, and pin locking means being provided on said fifth wheel mechanisms for locking said bogie engaging pins in said receptacles.

2. A vehicle according to claim 1 wherein said first and second pairs of spaced apart rails on said container bottom surface include a plurality of holes spaced apart from one another along the lengths of said rails, said fifth wheel carriage and said wheel carriage each having locking holes therein positioned to register with said holes in said rails one at a time during longitudinal movement thereon, said carriage locking means and said second locking means comprising pins adapted to be inserted selectively into said registered holes to prevent movement of said fifth wheel carriage and said highway wheel carriage with respect to said spaced apart rails.

3. A vehicle according to claim 1 wherein said spaced apart rails are C-shaped in cross-section, having a vertical web and upper and lower horizontal flanges.

4. A vehicle according to claim 1 wherein said first and second pairs of spaced apart rails each have an outer end adjacent said first and second ends respectively, of said bottom surface of said container and an inner end, said inner ends of said first pair of spaced apart rails being spaced apart from said inner ends of said second pair of spaced apart rails.

5. A vehicle according to claim 1 wherein said highway wheel carriage is selectively removable from said pair of spaced apart rails by rolling said rail wheels beyond said outer ends of said spaced apart rails.

6. A convertible rail and highway vehicle for use on railroad rails and for use on highways with a tractor having a fifth wheel hitch mechanism, said vehicle comprising:

first and second containers, each having an elongated bottom frame having first and second ends;

a fifth-wheel carriage having a fifth-wheel pin extending downwardly and being longitudinally lockably adjustable along said first end of said container floor for engagement with said fifth-wheel mechanism of said tractor;

a highway wheel carriage having a carriage frame and highway wheels, hubs and tires for engaging a highway, said highway wheels being rotatably secured to said carriage frame and being longitudinally lockably adjustable along and removeable from said second end of said container floor for longitudinal adjustability when converting said vehicle from said use on railroad rails and said use on highways, for removal when said use on said railroad rails, and for locked attachment when in said use on highways with said tractor;

a pair of bogie engaging pins mounted to each of said first and second ends of each of said first and second containers, said bogie engaging pin extending substantially vertically downwardly;

first, second and third bogies, each having a bogie frame, and a plurality of railroad wheels rotatably mounted to said bogie frame for rolling engagement with said railroad rails;

a pair of fifth wheel members being rotatably mounted on each of said bogie frames for rotation about a pair of spaced apart vertical axes, each of said fifth wheel members having a receptacle therein sized to receive one of said bogie engaging pins;

locking means on each of said fifth wheel members for selectively locking said bogie engaging pin in said receptacle;

said bogie engaging pin on said first end of said first container being positioned within said receptacle of one of said fifth wheel members of said first bogie;

said bogie engaging pin on said second end of said first container being positioned within one of said fifth wheel receptacles of said second bogie;

said bogie engaging pin on said first end of said second container being within the other of said fifth wheel receptacles on said second bogie; and said bogie engaging pin on said second end of said second container being within one of said fifth wheel receptacles of said third bogie.

7. A convertible intermodal rail and highway vehicle for use on railroad rails and for use on highways with tractors having a fifth-wheel mechanism, said vehicle having two king pin systems, one said king pin system for railroad use and the other said king pin system for highway use, said vehicle comprising:

an elongated container having a bottom exterior surface, said bottom exterior surface having first and second opposite ends and opposite lateral sides;

a first king pin system for railroad use having first and second bogie engaging pins attached to said first and second ends of said container and extending downwardly therefrom for removable attachment to railroad bogies;

said railroad bogies having a bogie frame having a longitudinal axis, a pair of wheel axles transverse to said longitudinal axis, railroad rails for rolling movement thereon, and first and second couplers extending from opposite ends of said bogie frame, a pair of fifth-wheel mechanisms pivotally mounted on said bogie frame for pivotal movement about first and second pivotal axes which are spaced apart longitudinally on said bogie frame, said fifth-wheel mechanisms each having a receptacle sized for receiving one of said bogie engaging pins, and pin locking means being provided on said fifth-wheel mechanisms for locking said bogie engaging pins in said receptacle;

a second king pin system for highway use having a fifth-wheel carriage having a fifth-wheel pin extending downwardly therefrom for engagement with said fifth-wheel mechanism of said highway tractor, said fifth wheel carriage having a base with a fifth-wheel plate to which said fifth-wheel pin is attached and having a plurality of wheels rotatably attached to said base retentively engaging a first pair of spaced apart rails mounted at one of said first ends of said container floor and being adapted to roll along said rails to permit longitudinal movement of said fifth-wheel carriage with respect to said container, and having carriage locking means for locking said fifth-wheel carriage to said first set of rails to prevent longitudinal movement thereon; and said second king pin system also utilizing a highway wheel carriage having a carriage frame, highway wheels for engaging a highway rotatably mounted to said carriage frame, and a plurality of wheels rotatably mounted to said carriage frame adapted to retentively engage a second pair of spaced apart rails mounted at said second end of said container floor for rolling movement thereon in the longitudinal direction with respect to said container, and having a second locking means for locking said carriage frame to said second pair of rails to hold said carriage frame against longitudinal movement thereon.

* * * * *